US010590823B2

(12) United States Patent
Paielli (10) Patent No.: US 10,590,823 B2
(45) Date of Patent: Mar. 17, 2020

(54) SYSTEMS AND METHODS FOR IMPROVING INJECTOR ACCURACY (71) Applicant: Tenneco Automotive Operating Company Inc., Lake Forest, IL (US)

(72) Inventor: Perry Paielli, Commerce Township, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 53 days.

(21) Appl. No.: 15/878,952

(22) Filed: Jan. 24, 2018

(65) Prior Publication Data
US 2019/0226375 A1   Jul. 25, 2019

(51) Int. Cl.
*F01N 3/20*   (2006.01)
*F01N 9/00*   (2006.01)

(52) U.S. Cl.
CPC .............. *F01N 3/208* (2013.01); *F01N 9/00* (2013.01); *F01N 2610/02* (2013.01); *F01N 2610/144* (2013.01); *F01N 2610/146* (2013.01); *F01N 2610/148* (2013.01); *F01N 2610/1433* (2013.01); *F01N 2610/1473* (2013.01); *F01N 2900/1808* (2013.01); *F01N 2900/1821* (2013.01); *F01N 2900/1822* (2013.01)

(58) Field of Classification Search
CPC combination set(s) only.
See application file for complete search history.

(56) References Cited

U.S. PATENT DOCUMENTS

| 8,161,735 | B2 | 4/2012 | Kitazawa |
| 8,161,808 | B2 | 4/2012 | Crawford et al. |
| 8,171,721 | B2 | 5/2012 | Boddy et al. |
| 8,474,244 | B2* | 7/2013 | Duret ............... F01N 3/208 60/274 |
| 8,813,475 | B2 | 8/2014 | Cho et al. |
| 8,875,491 | B2 | 11/2014 | Zapf et al. |
| 9,021,787 | B2* | 5/2015 | Yan ............... F01N 11/00 60/276 |
| 9,032,713 | B2 | 5/2015 | Nagaoka et al. |

(Continued)

FOREIGN PATENT DOCUMENTS

| DE | 102007033470 A1 | 1/2009 |
| DE | 102015202727 A1 | 8/2016 |

*Primary Examiner* — Binh Q Tran
(74) *Attorney, Agent, or Firm* — Harness, Dickey & Pierce, P.L.C.

(57) ABSTRACT

An exhaust aftertreatment system includes a pump configured to circulate a reagent, an injector configured to deliver the reagent into an exhaust stream, a sensor configured to (i) measure an operating parameter of the aftertreatment system and (ii) output a signal that indicates a value of the measured operating parameter, and a control module configured to control the injector based on the signal outputted by the sensor. The control module includes a correction coefficient determination module configured to generate a correction coefficient based on the signal outputted by the sensor. The control module further includes an injector control module configured to receive an injector flow control signal, determine a pulse width modulation (PWM) signal based on at least the injector flow control signal, and generate an injector control signal that controls actuation of the injector based on at least the correction coefficient and the PWM signal.

18 Claims, 6 Drawing Sheets (56) References Cited

U.S. PATENT DOCUMENTS

| | | | |
|---|---|---|---|
| 9,279,351 B2 | 3/2016 | Dingle et al. | |
| 9,546,585 B2 * | 1/2017 | Wang | F17D 3/00 |
| 9,677,443 B2 | 6/2017 | Cho et al. | |
| 9,890,678 B2 * | 2/2018 | Qi | F01N 3/208 |
| 2010/0071349 A1 * | 3/2010 | Kitazawa | F01N 3/2066 |
| | | | 60/277 |
| 2011/0113753 A1 * | 5/2011 | Christner | B01D 53/9409 |
| | | | 60/274 |
| 2011/0239625 A1 | 10/2011 | Fokkelman et al. | |
| 2012/0000189 A1 * | 1/2012 | Wang | F01N 3/208 |
| | | | 60/286 |

* cited by examiner

SYSTEMS AND METHODS FOR IMPROVING INJECTOR ACCURACY

FIELD

The present disclosure relates to measuring the flow of diesel emissions fluid (DEF) through an injector nozzle in an exhaust aftertreatment system for an internal combustion engine and, more particularly, systems and methods for adjusting the flow of DEF in an exhaust aftertreatment system without the use of a flow sensor.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

To reduce the quantity of undesirable particulate matter and nitrogen oxide (NOx) emitted to the atmosphere during internal combustion engine operation, a number of exhaust aftertreatment systems have been developed. A need for exhaust aftertreatment systems particularly may arise when diesel combustion processes are implemented.

One method used to reduce NOx emissions from internal combustion engines is known as selective catalytic reduction (SCR). SCR may include injecting a reagent into the exhaust stream of the engine to form a reagent and exhaust gas mixture that is subsequently passed through a reactor containing a catalyst. The catalyst is capable of reducing the NOx concentration in the presence of the reagent. For example only, the catalyst may include activated carbon or metals, such as platinum, vanadium, or tungsten. An aqueous urea solution is known to be an effective reagent in SCR systems for diesel engines.

Exhaust aftertreatment systems that use SCR include at least a pump to circulate the reagent and an injector to deliver the reagent into the exhaust stream. Aftertreatment systems require the delivery components, e.g. the injectors, to be cooled. Some aftertreatment systems use the reagent to cool the delivery components. As an example, the injector may have both a delivery flow and a return flow. The pump continuously circulates the reagent through the injector. When the injector is actuated, reagent is injected into the exhaust gas, i.e. delivery flow, and circulates back to the pump via a holding tank, i.e. return flow. When the injector is not actuated, the reagent only circulates back to the pump via the holding tank.

There is a need to accurately determine the flow of reagent that is injected into the exhaust stream.

SUMMARY

An exhaust aftertreatment system includes a pump configured to circulate a reagent, an injector configured to deliver the reagent into an exhaust stream, at least one sensor configured to (i) measure an operating parameter of the aftertreatment system and (ii) output a signal that indicates a value of the measured operating parameter and a control module configured to control the injector based on the signal outputted by the at least one sensor. The control module includes a correction coefficient determination module configured to generate a correction coefficient based at least on the signal outputted by the at least one sensor. The control module further includes an injector control module configured to receive an injector flow control signal that indicates a target flow rate of the reagent, determine a pulse width modulation (PWM) signal based on at least the injector flow control signal, and generate an injector control signal that controls actuation of the injector based on at least the correction coefficient and the PWM signal.

In other features, the at least one sensor includes a speed sensor configured to measure a speed of the pump, and output a speed signal based on the measured speed. Alternatively, sensorless pump control is possible where the pump position/speed is derived from the motor back emf. The injector control module is further configured to output an injector signal that indicates that the injector is actuated. The control module includes a pump speed storing module configured to in response to the injector signal indicating that the injector is not actuated, store the value of the speed signal as a first speed value, and in response to the injector signal indicating that the injector is actuated, store the value of the speed signal as a second speed value.

In other features, generating the correction coefficient includes determining a value of a ratio of the second speed value to the first speed value.

In other features, the at least one sensor includes a fluid pressure sensor configured to measure a pressure of the reagent and output a pressure signal based on the measured pressure. The injector control module is further configured to output an injector signal that indicates that the injector is actuated. The control module includes a fluid pressure storing module configured to in response to the injector signal indicating that the injector is not actuated, store the value of the pressure signal as a first pressure value, and in response to the injector signal indicating that the injector is actuated, store the value of the pressure signal as a second pressure value.

A method for controlling flow of reagent in an exhaust aftertreatment system, the method includes measuring an operating parameter of the aftertreatment system and outputting an operating parameter signal that indicates a value of the measured operating parameter. The method further includes receiving an injector flow control signal that indicates a target flow rate of the reagent and determining a pulse width modulation (PWM) signal based on at least the injector flow control signal. The method also includes generating a correction coefficient based at least on the operating parameter signal and generating an injector control signal that controls actuation of an injector based on at least the correction coefficient and the PWM signal.

In other features, the operating parameter of the aftertreatment system is a speed of a pump, the method further includes storing the value of the operating parameter signal when the injector is not actuated as a first speed value and storing the value of the operating parameter signal when the injector is actuated as a second speed value.

In other features, generating the correction coefficient includes determining a value of a ratio of the second speed value to the first speed value.

In other features, the operating parameter of the aftertreatment system is a fluid pressure of the reagent, the method further includes storing the value of the operating parameter signal when the injector is not actuated as a first pressure value and storing the value of the operating parameter signal when the injector is actuated as a second pressure value.

In other features, the injector includes a dosing orifice. Generating the correction coefficient includes determining a first flow of reagent through the dosing orifice based on the first pressure value and the second pressure value.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

An exhaust aftertreatment system can include a fluid delivery system that injects diesel emissions fluid (DEF), e.g. reagent, into an exhaust stream of an engine. The fluid delivery system may include a pump that circulates the DEF and an injector that delivers the DEF into the exhaust stream.

The physical variations of the components that make up the delivery system create a difference between the intended and actual flow of DEF injected into the exhaust stream. For example, two of the variable elements of the system are exhaust back pressure and injector flow rate. Neither back pressure nor injector flow is directly measured while the exhaust aftertreatment system is operating. Accordingly, their variations are not known and cannot be used in DEF flow control strategies.

According to the present disclosure, the flow of DEF into the exhaust stream is determined based on measured parameters such as fluid pressure and pump speed, as well as other known values.

Figure 1:
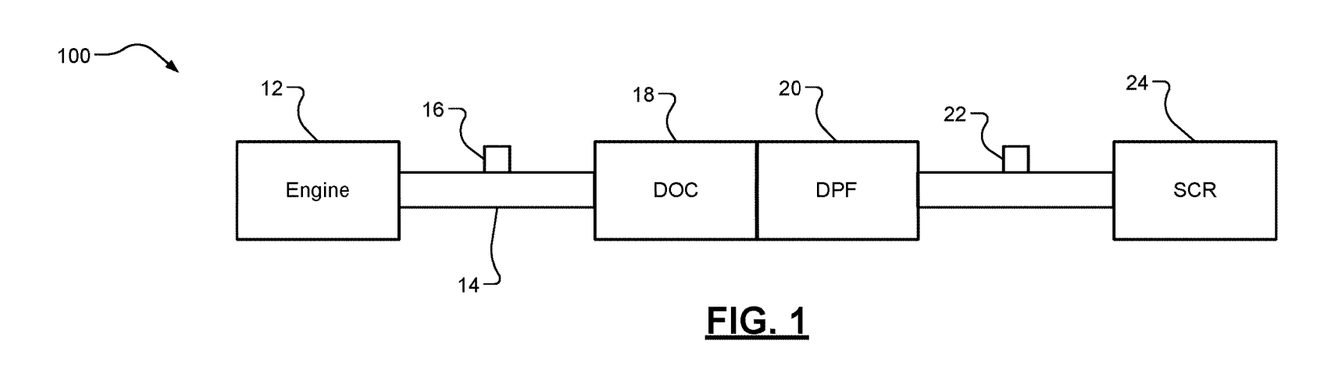
FIG. 1 is a functional block diagram of an example exhaust gas aftertreatment system.

FIG. 1 includes a functional block diagram of an exhaust gas aftertreatment system 100 for treating the exhaust output from a diesel internal combustion engine 12 in an exhaust (gas) passageway 14. The exhaust gas aftertreatment system 100 may include a first fluid delivery system 16, a diesel oxidation catalyst (DOC) 18, a diesel particulate filter (DPF) 20, a second fluid delivery system 22, and a selective catalytic reduction (SCR) catalyst 24. While FIG. 1 depicts only the engine 12 discharging exhaust gas into the exhaust passageway 14, in some embodiments, a plurality of internal combustion engines may discharge exhaust gas into the exhaust passageway 14 so that the exhaust gas aftertreatment system 10 collectively treats exhaust gas from multiple internal combustion engines. Multiple internal combustion engines may operate concurrently and/or independently of each other.

The first fluid delivery system 16 may spray diesel fuel (or another type of hydrocarbon or fuel) into the exhaust stream at or upstream of the DOC 18. The second fluid delivery system 22 may spray urea (or another type of reagent) into the exhaust stream at or upstream of the SCR catalyst 24. While an example orientation of components is provided in FIG. 1, the positioning of one or more components of the exhaust gas aftertreatment system 100 may be different than the positioning shown in the example of FIG. 1. The present disclosure is also applicable to exhaust gas aftertreatment systems having components positioned differently.

Figure 2:
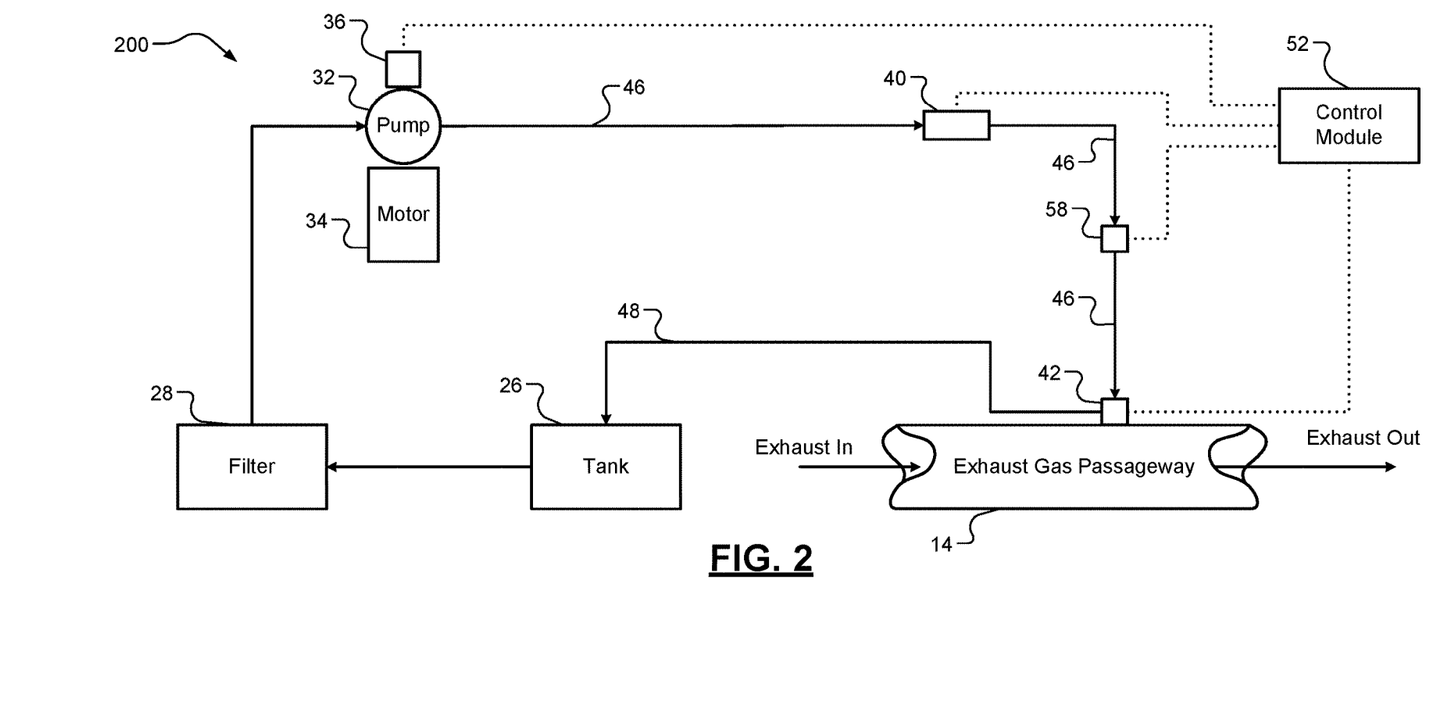
FIG. 2 is a function block diagram of an example fluid delivery system.

FIG. 2 includes a functional block diagram of an example fluid delivery system 200. Either or both of the first and second fluid delivery systems 16, 22 may be configured as shown in FIG. 2. The following description of the example fluid delivery system 200 of FIG. 2 may apply equally to the first and second fluid delivery systems 16, 22.

As shown in FIG. 2, the fluid delivery system 200 may include a tank 26, a filter 28, a pump 32, an electric motor 34, a pump speed sensor 36, a fluid pressure sensor 40, and an injector 42. The tank 26 stores fluid, such as the reagent (i.e. DEF). The electric motor 34 drives the pump 32. The pump 32 draws the fluid from the tank 26 and pumps the fluid to a supply passageway 46. The pump speed sensor 36 measures a speed of the pump 32. For example, the pump speed sensor 36 may measure the revolutions per minute (RPMs) of the pump 32. The pump speed sensor 36 generates a pump speed signal corresponding to the measured speed of the pump 32, and outputs the pump speed signal to a control module 52. The fluid flows into the tank 26 from a return passageway 48. The tank 26 may also include one or more other passes for inputting the fluid to the tank 26, such as fluid input by a user.

The fluid delivery system 200 of FIG. 2 is illustrated as including only one injector, the injector 42. However, the fuel delivery system 200 may include a different number of injectors including two or more injectors. The fluid delivery system 200 could include one or more injectors that inject fluid into separate exhaust passageways that correspond to different engines.

The pump 32 may draw the fluid from the tank 26 through the filter 28. The pump 32 supplies the fluid via the supply passageway 46 to the injector 42. The fluid pressure sensor 40 measures a pressure of the fluid in the supply passageway 46. The fluid pressure sensor 40 generates a pressure signal corresponding to the pressure, and outputs the pressure signal to the control module 52.

In various implementations, a urea quality sensor, such as urea quality sensor 58, may be disposed along the supply passageway 46. The urea quality sensor 58 may measure a concentration of a component of the reagent (e.g., a concentration of ammonia in urea) that is being supplied to the injector 42. The urea quality sensor 58 may generate a quality signal corresponding to the concentration and output the quality signal to the control module 52. In various implementations, the fluid delivery system 200 may include one or more other sensors.

The control module 52 actuates the injector 42 such that the injector 42 injects a first portion of the fluid flowing through the supply passageway 46 into the exhaust passageway 14 and, therefore, the exhaust stream flowing through the exhaust passageway 14. A second (remaining) portion of the fluid at the injector 42 flows into the tank 26 via the return passageway 48.

In one example implementation, the control module 52 controls actuation of the injector 42 based on the signals from the sensors including the pump speed signal from the pump speed sensor 36. In another example implementation, the control module 52 controls actuation of the injector 42 based on the signals from the sensors including the pressure signal from the fluid pressure sensor 40.

The control module 52 may control opening of the injector 42 to control the amount of fluid that is injected into the exhaust stream. The control module 52 may determine characteristics of a pulse width modulation (PWM) signal to apply to the injector 42 to achieve a target flow rate of reagent into the exhaust passageway 14. Examples of characteristics include, for example, ON period, ON time, OFF time, etc.

The control module 52 may control operation and speed of the pump 32 based on a pressure, such as a target pressure at the fluid pressure sensor 40. The target pressure may be a fixed value or may be variable. In the example of a variable target pressure, the control module 52 may determine the target pressure based on one or more operating parameters, such as engine speed, engine load, engine temperature, exhaust gas temperature, and/or exhaust gas flow rate.

Figure 3:
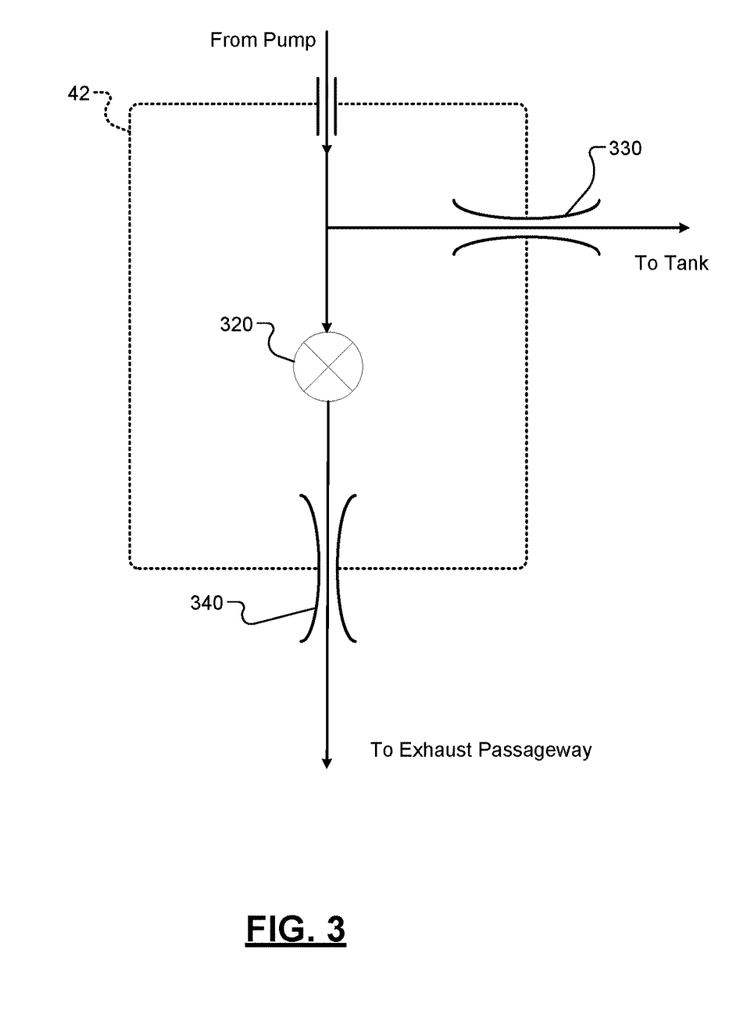
FIG. 3 is a schematic view of an example implementation of an injector.

FIG. 3 is a schematic view of an example implementation of the injector 42. The injector 42 includes a solenoid 320, a return orifice 330, and a dosing orifice 340. The pump 32 supplies the injector 42 with fluid (e.g. DEF). When the injector 42 is not actuated, the solenoid 320 is not energized and the fluid only flows through the return orifice 330. When the injector 42 is actuated, the solenoid 320 is energized and the fluid flows through both the dosing orifice 340 and the return orifice 330. The fluid that travels through the dosing orifice 340 enters the exhaust passageway 14. The fluid that travels through the return orifice 330 returns to the tank 26, for example, via the return manifold 44. The magnitude of the flow of fluid through the dosing orifice 340 and the return orifice 330 is directly proportional to the size of each orifice and the pressure drop across each orifice. The pressure drop across the return orifice 330 is the same as the fluid pressure measured at the fluid pressure sensor 40. The pressure drop across the dosing orifice 340 is the fluid pressure measured at the fluid pressure sensor 40 minus exhaust back pressure in the exhaust passageway 14. In the injector 42, the size of each orifice may change over time, for example due to wear. In addition, in the fluid delivery system 200, the exhaust back pressure may also vary over time.

In contrast to the injector 42, the size of a return orifice and the size of a dosing orifice in an ideal injector remain constant. In addition, in the ideal injector, the pressure drop across both the return orifice and the dosing orifice is the same, e.g. the fluid pressure measured at the fluid pressure sensor 40. In other words, in the ideal injector the exhaust back pressure is equal to zero.

Figure 4:
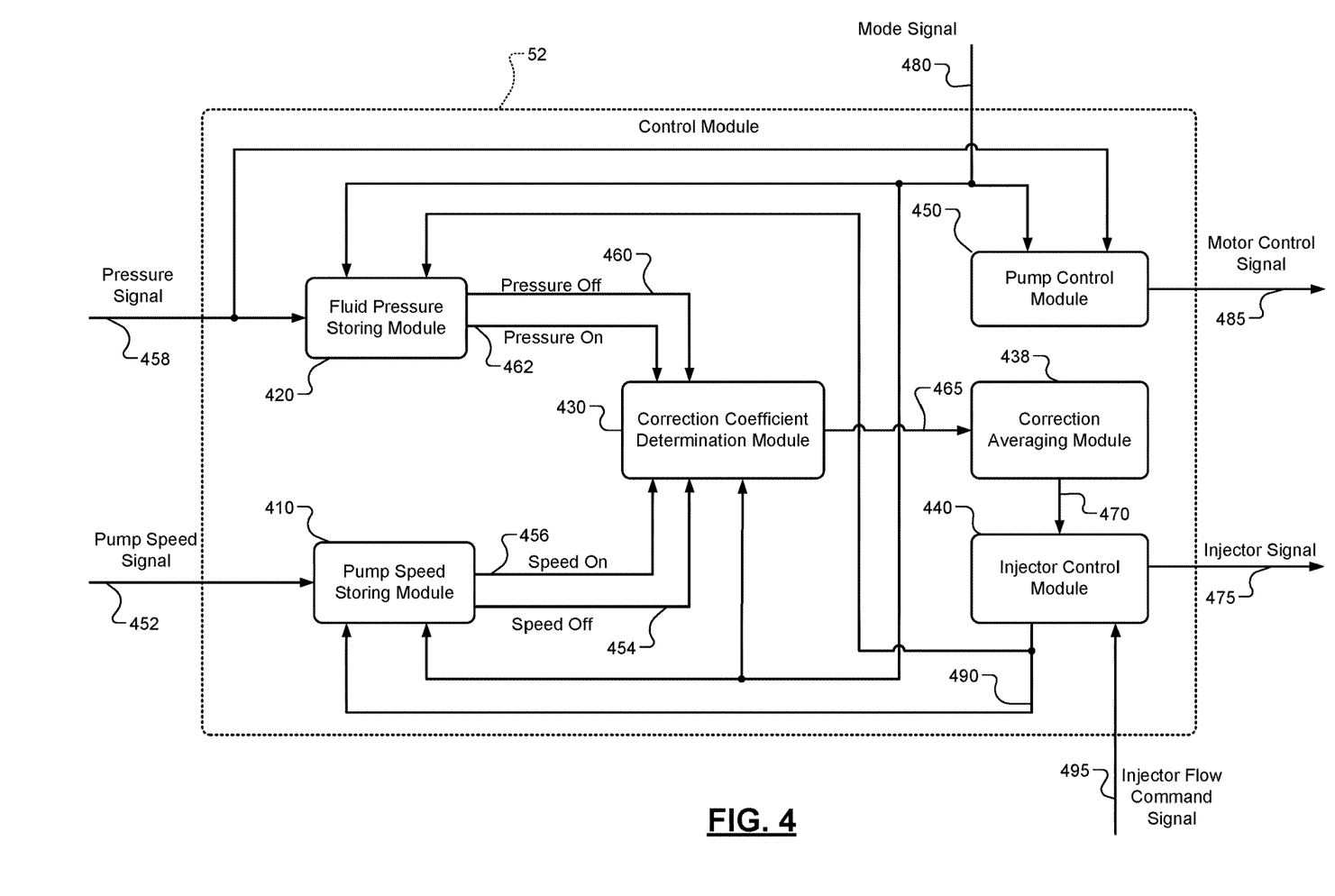
FIG. 4 is a functional block diagram of an example implementation of a control module.

FIG. 4 includes a functional block diagram of an example implementation of the control module 52. The control module 52 includes a pump speed storing module 410, a fluid pressure storing module 420, a correction coefficient determination module 430, a correction averaging module 438, an injector control module 440, and a pump control module 450. The pump speed storing module 410 stores a value of a pump speed signal 452 when the injector 42 is not actuated as $speed_{off}$ 454 and stores a value of the pump speed signal 452 when the injector 42 is actuated as $speed_{off}$ 456. The pump speed storing module 410 outputs the stored values (i.e. $speed_{off}$ 454 and $speed_{off}$ 456) to the correction coefficient determination module 430. The fluid pressure storing module 420 stores a value of a pressure signal 458 when the injector 42 is not actuated as $pressure_{off}$ 460 and stores a value of the pressure signal 458 when the injector 42 is actuated as $pressure_{on}$ 462. The fluid pressure storing module 420 outputs the stored values (i.e. $pressure_{off}$ 460 and $pressure_{on}$ 462) to the correction coefficient determination module 430.

The correction coefficient determination module 430 determines a correction coefficient 465 based on the received values and outputs the correction coefficient 465 to the correction averaging module 438. The correction averaging module 438 determines an average value of the correction coefficient 465 over a predetermined period of time and stores the value as a correction average 470. The correction averaging module 438 outputs the correction average 470 to the injector control module 440. The injector control module 440 generates, based on the correction average 470, an injector signal 475 that controls actuation of the injector 42. For example, the injector signal 475 controls actuation of the solenoid 320 of the injector 42.

The pump control module 450 controls a rotational speed of the pump 32 based on a mode signal 480. The pump control module 450 may also control the rotational speed of the pump 32 based on the pressure signal 458 from the fluid pressure sensor 40. The mode signal 480 indicates whether the fluid delivery system 200 is operating in a constant pump speed mode or in a constant pressure mode. In response to the mode signal 480 indicating that the fluid delivery system 200 is operating in the constant pump speed mode, the pump control module 450 generates a motor control signal 485 that causes that the motor 34 and the pump 32 to operate at a target speed.

In response to the mode signal 480 indicating that the fluid delivery system 200 is operating in the constant pressure mode, the pump control module 450 adjusts the motor control signal 485 based on the pressure signal 458 to maintain a target pressure. For example, the pump control module 450 may adjust the rotational speed of the motor of the pump 32 in closed loop to adjust the pressure toward or to the target pressure. The pump control module 450 may, for example, increase the rotational speed of the electric motor when the pressure is less than the target pressure and decrease the rotational speed of the electric motor when the pressure is greater than the target pressure.

The pump control module 450 may adjust the rotational speed of the electric motor 34 of the pump 32 by adjusting power application to the electric motor 34 of the pump 32. For example, the pump control module 450 may increase one or more electrical parameters (e.g., voltage, current, ON period of duty cycle) applied to the electric motor 34 to increase the rotational speed and vice versa.

The pump speed storing module 410 stores the value of the pump speed signal 452 based on the mode signal 480 and an injector actuation signal 490 from the injector control module 440. The injector actuation signal 490 indicates whether the injector 42 is actuated or if the injector 42 is not actuated. In response to the mode signal 480 indicating that the fluid delivery system 200 is operating in constant pump speed mode and the injector actuation signal 490 indicating that the injector 42 is not actuated, the pump speed storing module 410 stores the value of the pump speed signal 452 from the pump speed sensor 36 as $speed_{off}$ 454. In response to the mode signal 480 indicating that the fluid delivery system 200 is operating in constant pump speed mode and the injector actuation signal 490 indicating that the injector 42 is actuated, the pump speed storing module 410 stores the value of the pump speed signal 452 as $speed_{off}$ 456. The pump speed storing module 410 outputs the values of $speed_{off}$ 454 and $speed_{off}$ 456 to the correction coefficient determination module 430.

The fluid pressure storing module 420 stores the value of the pressure signal 458 based on the mode signal 480 and the injector actuation signal 490 from the injector control module 440. For example, in response to the mode signal 480 indicating that the fluid delivery system 200 is operating in the constant pump speed mode and the injector actuation signal 490 indicating that the injector 42 is not actuated, the fluid pressure storing module 420 stores the value of the pressure signal 458 as pressure$_{off}$ 560. In response to the mode signal 480 indicating that the fluid delivery system 200 is operating in constant pump speed mode and the injector actuation signal 490 indicating that the injector 42 is actuated, the fluid pressure storing module 420 stores the value of the pressure signal 458 as pressure$_{on}$ 462. The fluid pressure storing module 420 outputs the values of pressure$_{off}$ 460 and pressure$_{on}$ 462 to the correction coefficient determination module 430.

The correction coefficient determination module 430 determines the correction coefficient 465 based either on (i) the values of speed$_{off}$ 454 and speed$_{on}$ 456 from the pump speed storing module 410 or (ii) the values of pressure$_{off}$ 460 and pressure$_{on}$ 462 from the fluid pressure storing module 420. The correction coefficient determination module then outputs the correction coefficient 465 to the correction averaging module 438.

For example, in response to the mode signal 480 indicating that the fluid delivery system 200 is operating in the constant pressure mode, the correction coefficient determination module 430 uses equation 1 (eq 1) below to calculate the correction coefficient 465.

$$C_C = f\left(\frac{R_F}{R_S}\right) \quad \text{eq 1}$$

In eq 1, $C_c$ represents the correction coefficient 465. $C_c$ is the result of a predetermined function $f(R_F/R_S)$. The term $R_F$ represents the ratio of fluid flow through an ideal injector when the ideal injector is actuated to the fluid flow through the ideal injector when the ideal injector is not actuated, as defined in equation 2 (eq 2) below.

$$R_F = \frac{\text{Ideal Return Flow} + \text{Ideal Dosing Flow}}{\text{Ideal Bypass Flow}} \quad \text{eq 2}$$

In eq 2, the term Ideal Return Flow represents the flow of fluid through a return orifice of the ideal injector when the ideal injector is actuated (i.e. on). The term Ideal Dosing Flow represents the flow of fluid though a dosing orifice of the ideal injector when the ideal injector is actuated (i.e. on). The term Ideal Bypass Flow represents the flow of fluid though the return orifice of the ideal injector when the ideal injector is not actuated (i.e. off). The terms Ideal Return Flow, Ideal Dosing Flow, and Ideal Bypass Flow in eq 2 are known constants that are unique to the fluid delivery system 200. Accordingly, the value of $R_F$ may be stored in the correction coefficient determination module 430.

The term $R_S$, in eq 1, is the ratio of the speed of the pump 32 when the injector 42 is actuated to the speed of the pump 32 when the injector 42 is not actuated. The correction coefficient determination module 430 calculates the value of $R_S$ based on the values of speed$_{on}$ 456 and speed$_{off}$ 454 received from the pump speed storing module 410.

In one example implementation, the predetermined function in eq 1 is a reciprocal function. For example, $C_C$ is equal to $R_S/R_F$. In other implementations, the predetermined function in eq 1 may be another suitable function.

In response to the mode signal 480 indicating that the fluid delivery system 200 is operating in constant pump speed mode, the correction coefficient determination module 430 uses equation 3 (eq 3) below to calculate the correction coefficient 465.

$$C_C = f\left(\frac{Q_{INJ}}{Q_{IDEAL}}\right) \quad \text{eq 3}$$

In eq 3, $C_c$ represents the correction coefficient 465. $C_c$ is the result of a predetermined function $f(Q_{INJ}/Q_{IDEAL})$. The term $Q_{IDEAL}$ in eq 3 represents the flow of fluid though a dosing orifice of an ideal injector when the ideal injector is actuated (i.e. on). The term $Q_{IDEAL}$ is a known constant that is unique to the fluid delivery system 200. Accordingly, the value of $Q_{IDEAL}$ may be stored in the correction coefficient determination module 430.

The term $Q_{INJ}$ in eq 3 represents the flow of fluid through the dosing orifice 340 of the injector 42 when the injector is actuated (i.e. on). The correction coefficient determination module 430 uses equation 4 (eq 4) below to calculate the value of $Q_{INJ}$.

$$Q_{INJ} = Q_{RTN}\left[\left(1 + \frac{C_{INJ}}{C_{RTN}}\right)\sqrt{\frac{P_{ON}}{P_{OFF}}} - 1\right] \quad \text{eq 4}$$

In eq 4, $C_{INJ}$ is a dosing orifice area and flow coefficient specific to the dosing orifice 340 of the injector 42. $C_{RTN}$ is a return orifice area and flow coefficient specific to the return orifice 330 of the injector 42. $C_{INJ}$ and $C_{RTN}$ are known constants that are unique to the injector 42. Accordingly, the values of $C_{INJ}$ and $C_{RTN}$ may be stored in the correction coefficient determination module 430.

In eq 4, the term $P_{ON}$ represents the fluid pressure when the injector 42 is actuated and the term $P_{OFF}$ represents the fluid pressure when the injector 42 is not actuated. The correction coefficient determination module 430 uses the values pressure$_{on}$ 462 and pressure$_{off}$ 460 received from the fluid pressure storing module as the values of $P_{ON}$ and $P_{OFF}$, respectively, to generate the correction coefficient 465.

In eq 4, the term $Q_{RTN}$ represents the flow of fluid through the return orifice 330 of the injector 42, as defined by equation 5 (eq 5) below. In other words, using eq 4 to determine the flow of fluid through the dosing orifice 340 of the injector 42 when the injector is actuated (i.e. $Q_{INJ}$) includes determining the flow of fluid through the return orifice 330 of the injector 42 (i.e. $Q_{RTN}$).

$$Q_{RTN} = \frac{\rho}{2}C_{RTN}\sqrt{P} \quad \text{eq 5}$$

In eq 5, the term ρ represents the density of the fluid and is a known constant that is unique to the fluid delivery system 200. Accordingly, the value of ρ may be stored in the correction coefficient determination module 430. As previously noted, $C_{RTN}$ is the return orifice area and flow coefficient specific to the return orifice 330 of the injector 42.

In eq 5, the term P represents the fluid pressure as measured by the fluid pressure sensor 40. In one example implementation, the correction coefficient determination module 430 uses the value pressure$_{off}$ 460 received from the fluid pressure storing module 420 as the value of P to determine $Q_{RTN}$. In other implementations, the correction coefficient determination module 430 uses the value pressure$_{on}$ 462 received from the fluid pressure storing module 420 as the value of P to determine $Q_{RTN}$.

In one example implementation, the predetermined function in eq 3 is a reciprocal function. For example, $C_C$ is equal to $Q_{IDEAL}/Q_{INJ}$. In other implementations, the predetermined function in eq 3 may be another suitable function.

The correction averaging module 438 determines the average value of the correction coefficient 465 received from the correction coefficient determination module 430 over a predetermined period of time. For example only, the predetermined period of time may be or correspond to approximately two minutes or another suitable period. The correction averaging module 438 includes a nonvolatile memory and stores the determined average value as the correction average 470 in the nonvolatile memory. The correction averaging module 438 outputs the correction average 470 to the injector control module 440.

Since the correction average 470 is stored in nonvolatile memory, in some instances, the correction averaging module 438 may output the correction average 470 prior to receiving the correction coefficient 465 from the correction coefficient determination module 430. For example, when the fluid delivery system 200 resumes operation, e.g. engine 12 is shut down and at a later time restarted, the correction averaging module 438 may output the correction average 470 that was stored in the nonvolatile memory before the engine 12 was shut down.

The pump speed sensor 36 and the fluid pressure sensor 40 may be sensors that are susceptible to noise. Since the correction coefficient determination module 430 calculates the correction coefficient 465 based on values obtained from the pump speed sensor 36 or the fluid pressure sensor 40, the noise can directly affect the value of the correction coefficient 465. The correction averaging module 438 determines the average value of the correction coefficient 465 to reduce the effects of the noise on the correction coefficient 465.

The injector control module 440 controls the actuation of the injector 42 based on at least the correction average 470 and an injector flow command signal 495. The injector flow command signal 495 indicates a target flow rate for the injector 42. The injector control module outputs the injector signal 475 to control the amount of fluid that is injected into the exhaust stream. For example, the injector control module 440 may determine characteristics of a pulse width modulation (PWM) signal to achieve the target flow rate indicated by the injector flow command signal 495 for an ideal injector. Examples of characteristics include, for example, ON period, ON time, OFF time, etc. The injector control module 440 generates the injector signal 475 by using the correction average 470 provided by the correction averaging module 438 to adjust the determined PWM signal. In one example implementation, the injector control module generates the injector signal 475 by multiplying the PWM signal by the correction average 470. In other implementations, the injector control module 440 incrementally adjusts the PWM signal based on the correction average 470, as described in detail below.

Figure 5A:
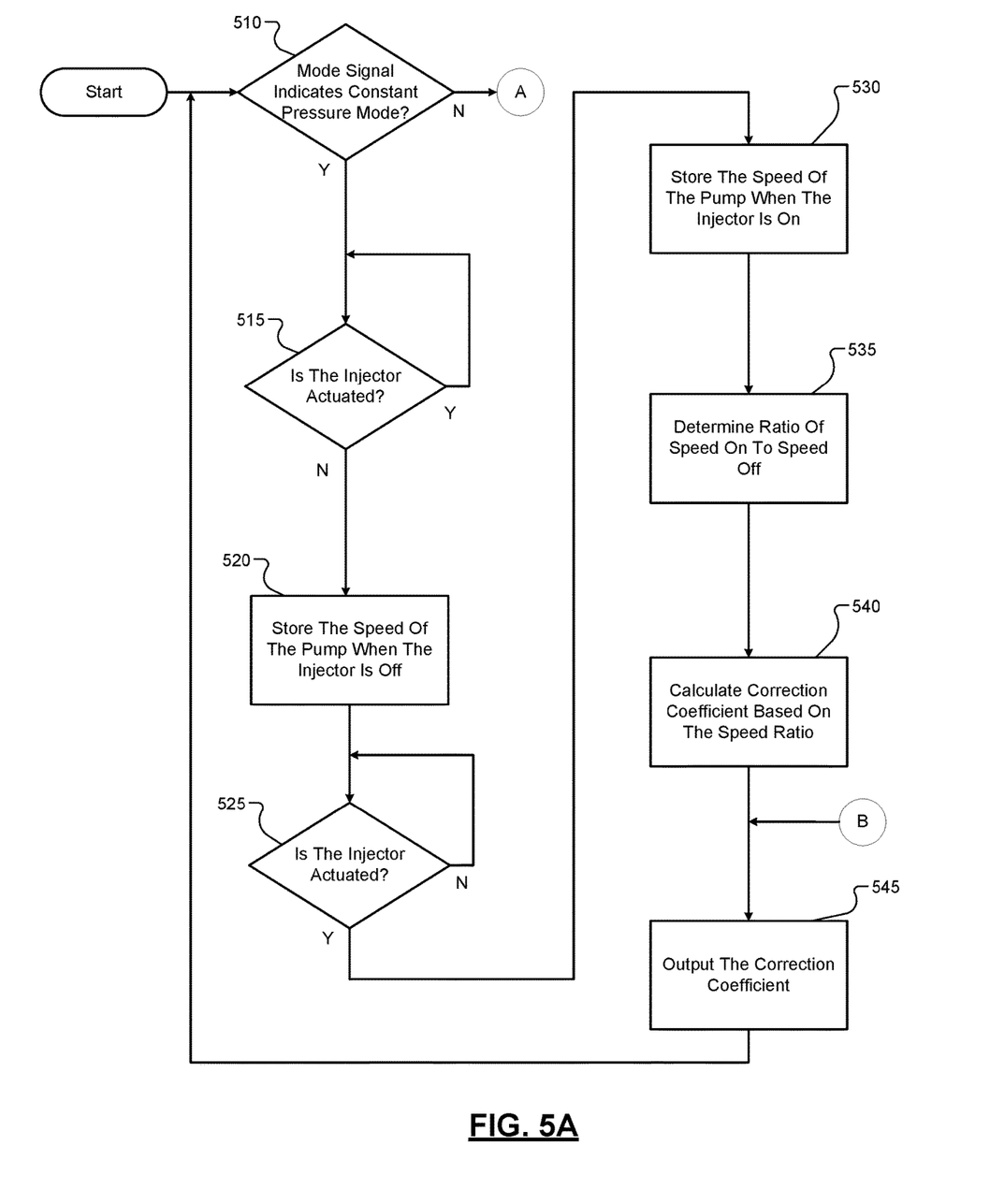
FIGS. 5A and 5B include a flowchart depicting an example method of generating a correction coefficient.
Figure 5B:
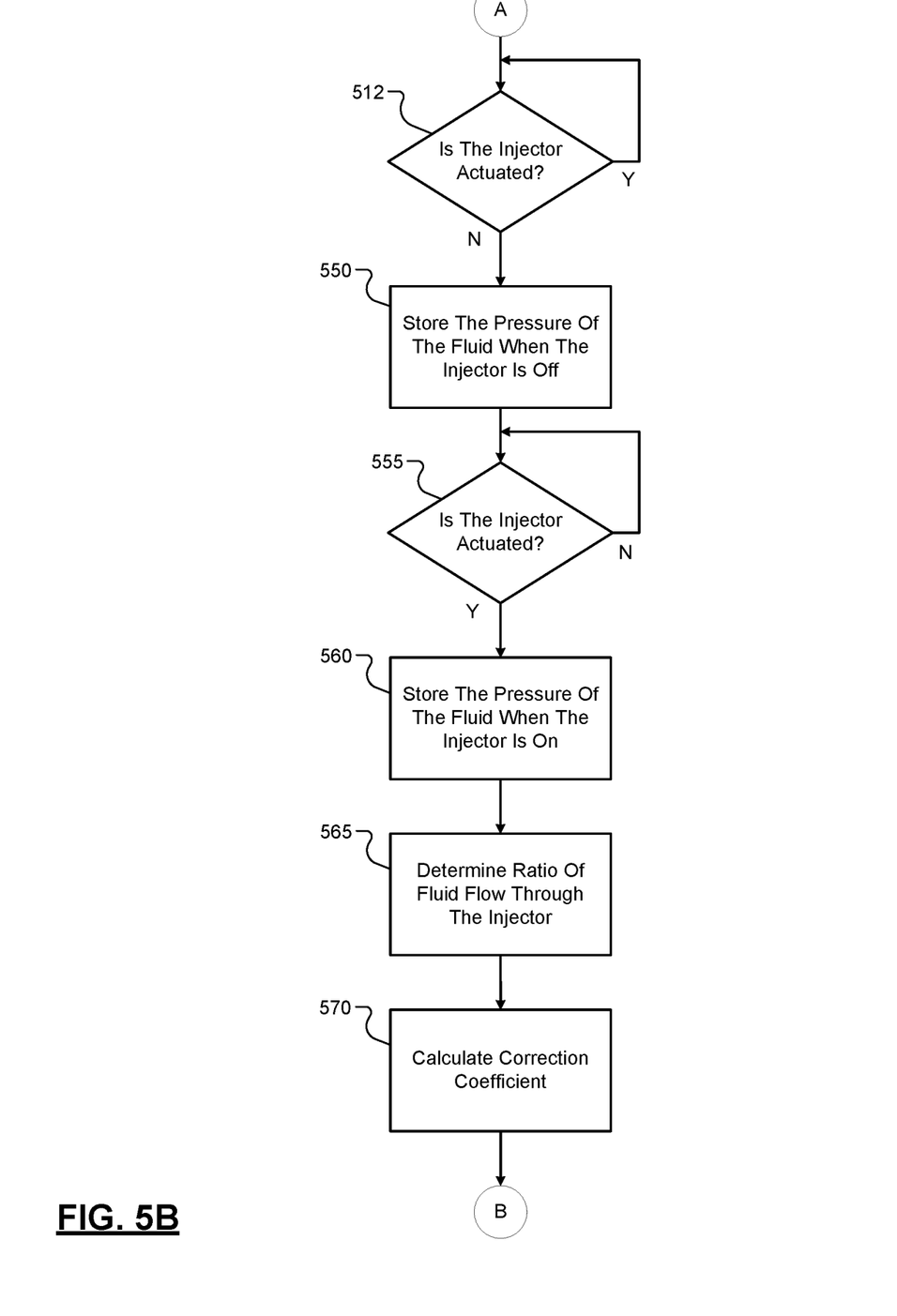

FIGS. 5A and 5B include a flowchart that depicts an example method of generating the correction coefficient 465. Control begins at 510. At 510, the control module 52 determines whether the mode signal 480 indicates that the fluid delivery system 200 is operating in constant pressure mode. If 510 is false, controls transfers to 512 (FIG. 5B). If 510 is true, control continues to 515. At 515, the pump speed storing module 410 determines whether the injector actuation signal 490 indicates that the injector 42 is actuated. If 515 is true, control remains at 515.

If 515 is false, control continues with 520. At 520, the pump speed storing module 410 stores the value of the pump speed signal 452 as speed$_{off}$ 454 and outputs the value of speed$_{off}$ 454 to the correction coefficient determination module 430. Control continues with 525. At 525, the pump speed storing module 410 determines whether the injector actuation signal 490 indicates that the injector 42 is actuated. If 515 is false, control remains at 525. If 525 is true, control continues with 530.

At 530, the pump speed storing module 410 stores the value of the pump speed signal 452 as speed$_{on}$ 456 and outputs the value of speed$_{on}$ 456 to the correction coefficient determination module 430. At 535, the correction coefficient determination module 430 determines the value of the ratio speed$_{on}$ 456 to speed$_{off}$ 454. At 540, the correction coefficient determination module 430 generates the correction coefficient 465 based on the value of the ratio speed$_{on}$ 456 to speed$_{off}$ 454, other stored values, and eq 1, as previously described. Control then continues with 545.

At 545, the correction coefficient determination module 430 outputs the correction coefficient 465 to the correction averaging module 438. Control then returns to 510.

At 512 (FIG. 5B), the fluid pressure storing module 420 determines whether the injector actuation signal 490 indicates that the injector 42 is actuated. If 520 is true, control remains at 520. If 520 is false, control continues with 550. At 550, the fluid pressure storing module 420 stores the value of the pressure signal 458 as pressure$_{off}$ 460 and outputs the value of pressure$_{off}$ 460 to the correction coefficient determination module 430. Control continues with 555. At 555, the fluid pressure storing module 420 determines whether the injector actuation signal 490 indicates that the injector 42 is actuated. If 555 is false, control remains at 555. If 555 is true, control continues with 560.

At 560, the fluid pressure storing module 420 stores the value of the pressure signal 458 as pressure$_{on}$ 462 and outputs the value of pressure$_{on}$ 462 to the correction coefficient determination module 430. At 565, the correction coefficient determination module 430 uses the values pressure$_{on}$ 462 and pressure$_{off}$ 460, as well as other stored values, to determine the value of the ratio of the flow through the dosing orifice of the injector 42 when the injector 42 is actuated to the flow of fluid through the ideal injector. At 570, the correction coefficient determination module 430 generates the correction coefficient 465 based on the determined flow ratio using eq 3, as previously described. Control then continues with 545, as described above.

Figure 6:
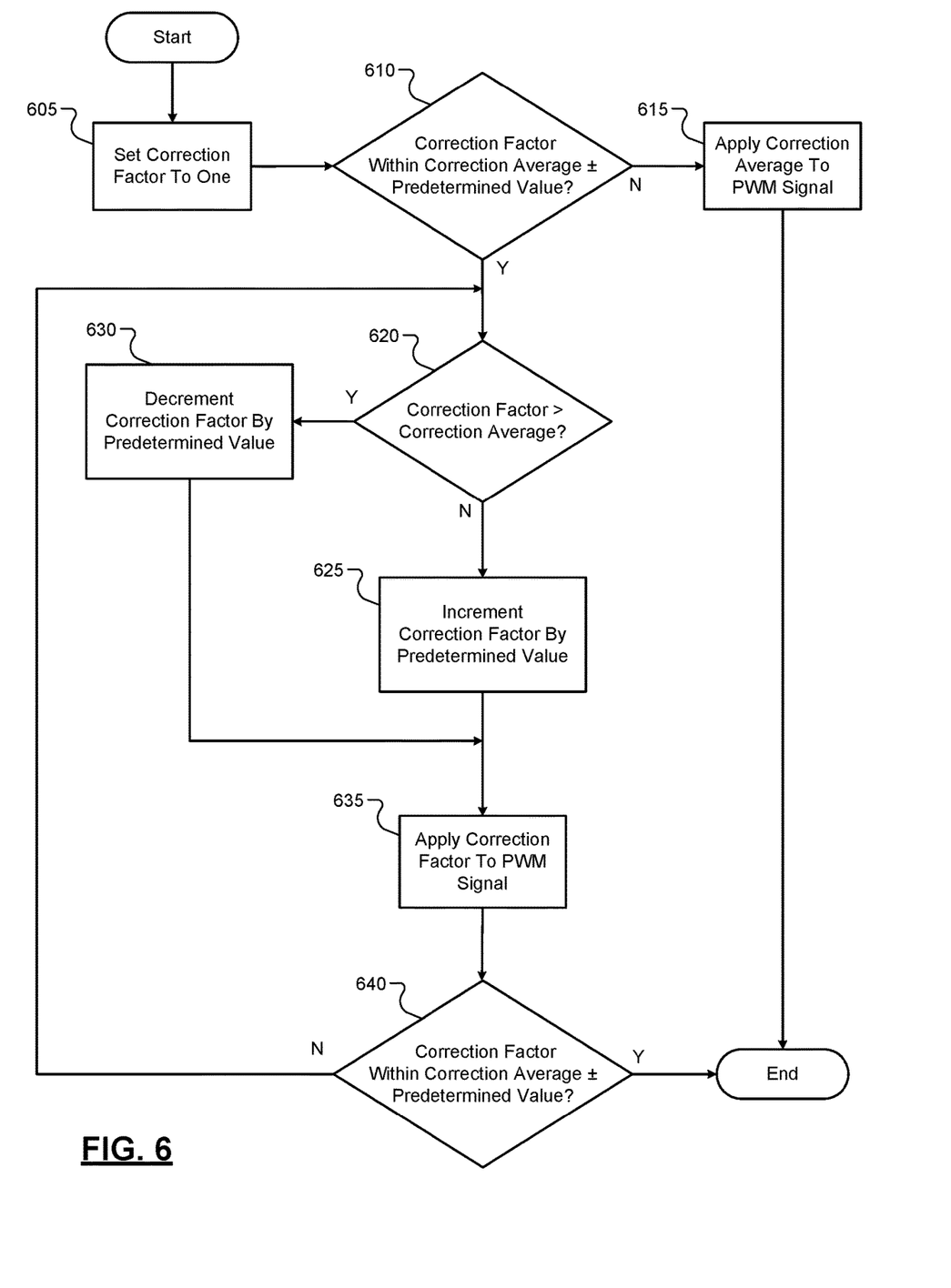
FIG. 6 includes a flowchart depicting an example method of incrementally applying a correction average.

FIG. 6 includes a flowchart that depicts an example method of incrementally applying the correction average 470. Control begins with 605, where the injector control module 440 sets the value of a correction factor to one. Control then continues with 610. At 610, the injector control module 440 determines whether (i) the correction factor is less than or equal to the correction average 470 plus a predetermined value and (ii) the correction factor is greater than or equal to the correction average 470 minus the predetermined value. In one example implementation, the predetermined value is 0.01. In other implementations, the predetermined value may be any suitable value.

If 610 is true, control transfers to 615. At 615, the injector control module 440 generates the injector signal 475 by multiplying the determined PWM signal by the correction average 470. Control then ends.

If 610 is false, control transfers to 620. At 620, the injector control module 440 determines whether the correction factor is greater than the correction average 470. If 620 is false, control transfers to 625. At 625, the injector control module 440 increments the correction factor by adding the predetermined value to the correction factor, control then continues with 635. If 620 is true, control transfers to 630. At 630, the injector control module 440 decrements the correction factor by subtracting the predetermined value from the correction factor, control then continues with 635. At 635, the injector control module 440 generates the injector signal 475 by multiplying the determined PWM signal by the correction factor. Control then continues to 640.

At 640, the injector control module 440 determines whether (i) the correction factor is less than or equal to the correction average 470 plus the predetermined value and (ii) the correction factor is greater than or equal to the correction average 470 minus the predetermined value. If 640 is true, control ends. If 640 is false, control returns to 620.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include, or rely, on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An exhaust aftertreatment system comprising:
a pump configured to circulate a reagent;
an injector configured to deliver the reagent into an exhaust stream;
at least one sensor configured to (i) measure an operating parameter of the aftertreatment system and (ii) output a signal that indicates a value of the measured operating parameter,
wherein the at least one sensor includes a speed sensor configured to:
measure a speed of the pump; and
output a speed signal based on the measured speed; and
a control module configured to control the injector based on the signal output by the at least one sensor, wherein the control module includes:
a correction coefficient determination module configured to generate a correction coefficient based at least on the signal outputted by the at least one sensor;
an injector control module configured to:
output an injector signal that indicates whether the injector is actuated;
receive an injector flow control signal that indicates a target flow rate of the reagent,
determine a pulse width modulation (PWM) signal based on at least the injector flow control signal, and
generate an injector control signal that controls actuation of the injector based on at least the correction coefficient and the PWM signal; and
a pump speed storing module configured to:
in response to the injector signal indicating that the injector is not actuated, store the value of the speed signal as a first speed value, and
in response to the injector signal indicating that the injector is actuated, store the value of the speed signal as a second speed value.

2. The exhaust aftertreatment system of claim 1, wherein generating the correction coefficient includes determining a value of a ratio of the second speed value to the first speed value.

3. The exhaust aftertreatment system of claim 1, wherein:
the at least one sensor further includes a fluid pressure sensor configured to:
measure a pressure of the reagents; and
output a pressure signal based on the measured pressure; and
the control module includes a fluid pressure storing module configured to:
in response to the injector signal indicating that the injector is not actuated, store the value of the pressure signal as a first pressure value; and
in response to the injector signal indicating that the injector is actuated, store the value of the pressure signal as a second pressure value.

4. The exhaust aftertreatment system of claim 3, wherein:
the injector includes a dosing orifice, and
generating the correction coefficient includes determining a first flow of reagent through the dosing orifice based on the first pressure value and the second pressure value.

5. The exhaust aftertreatment system of claim 4, wherein:
the injector includes a return orifice, and
determining the first flow of reagent through the dosing orifice includes determining a second flow of reagent through the return orifice.

6. The exhaust aftertreatment system of claim 1, wherein the control module includes a correction averaging module configured to:
determine an average value of the correction coefficient over a predetermined period of time,
store the determined average value as a correction average, and
output the correction average to the injector control module.

7. The exhaust aftertreatment system of claim 6, wherein generating the injector control signal includes multiplying the PWM signal by the correction average.

8. The exhaust aftertreatment system of claim 6, wherein generating the injector control signal includes incrementally adjusting the PWM signal by the correction average.

9. The exhaust aftertreatment system of claim 1, further comprising a motor that drives the pump,
wherein the control module includes a pump control module configured to generate a motor control signal that controls the motor.

10. A method for controlling flow of reagent in an exhaust aftertreatment system, the method comprising:
by a sensor, measuring an operating parameter of the aftertreatment system,
wherein the sensor is a speed sensor and the operating parameter of the aftertreatment system includes a speed of a pump;
by the sensor, outputting an operating parameter signal that indicates a value of the measured operating parameter;
by a control module, receiving an injector flow control signal that indicates a target flow rate of the reagent;

by the control module, determining a pulse width modulation (PWM) signal based on at least the injector flow control signal;

by the control module, generating a correction coefficient based at least on the operating parameter signal;

by the control module, generating an injector control signal that controls actuation of an injector based on at least the correction coefficient and the PWM signal;

by the control module, storing the value of the operating parameter signal as a first speed value when the injector is not actuated; and by the control module, storing the value of the operating parameter signal as a second speed value when the injector is actuated.

11. The method of claim 10, wherein generating the correction coefficient includes determining a value of a ratio of the second speed value to the first speed value.

12. The method of claim 10, further comprising:
by a fluid pressure sensor, measuring a fluid pressure of the reagent;
by the fluid pressure sensor, outputting a pressure signal based on the measured pressure;
by the control module, storing the value of the pressure signal when the injector is not actuated as a first pressure value; and
by the control module, storing the value of the pressure signal when the injector is actuated as a second pressure value.

13. The method of claim 12, wherein:
the injector includes a dosing orifice, and
generating the correction coefficient includes determining a first flow of reagent through the dosing orifice based on the first pressure value and the second pressure value.

14. The method of claim 13, wherein:
the injector includes a return orifice, and
determining the first flow of reagent through the dosing orifice includes determining a second flow of reagent through the return orifice.

15. The method of claim 10, further comprising:
by the control module, determining an average value of the correction coefficient over a predetermined period of time; and
by the control module, storing the determined average value as a correction average.

16. The method of claim 15, wherein generating the injector control signal includes multiplying the PWM signal by the correction average.

17. The method of claim 15, wherein generating the injector control signal includes incrementally adjusting the PWM signal by the correction average.

18. The method of claim 15, wherein storing the determined average value as the correction average includes storing the determined average value in a nonvolatile memory.

* * * * *